US012534085B2

(12) United States Patent
Okamura et al.

(10) Patent No.: US 12,534,085 B2
(45) Date of Patent: Jan. 27, 2026

(54) METHOD AND VEHICLE CONTROL DEVICE

(71) Applicants: MITSUBISHI JIDOSHA KOGYO KABUSHIKI KAISHA, Tokyo (JP); The University of Tokyo, Tokyo (JP)

(72) Inventors: Yutaro Okamura, Tokyo (JP); Hiroshi Fujimoto, Tokyo (JP); Hiroyuki Fuse, Tokyo (JP); Guangzhi Yu, Tokyo (JP); Naoki Takahashi, Tokyo (JP); Ryota Takahashi, Tokyo (JP); Shunsuke Matsuo, Tokyo (JP); Ryosuke Koga, Tokyo (JP)

(73) Assignees: MITSUBISHI JIDOSHA KOGYOKABUSHIKI KAISHA, Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 18/880,741

(22) PCT Filed: Jul. 11, 2023

(86) PCT No.: PCT/JP2023/025523
§ 371 (c)(1),
(2) Date: Jan. 2, 2025

(87) PCT Pub. No.: WO2024/038710
PCT Pub. Date: Feb. 22, 2024

(65) Prior Publication Data
US 2025/0381964 A1    Dec. 18, 2025

(30) Foreign Application Priority Data
Aug. 16, 2022   (JP) .................................. 2022-129522

(51) Int. Cl.
*B60W 30/18* (2012.01)
*B60W 30/188* (2012.01)
(Continued)

(52) U.S. Cl.
CPC .... *B60W 30/188* (2013.01); *B60W 30/18145* (2013.01); *B60W 40/10* (2013.01); *B60W 2050/0028* (2013.01)

(58) Field of Classification Search
CPC ......... B60W 30/188; B60W 30/18145; B60W 40/10; B60W 2050/0028
See application file for complete search history.

(56) References Cited

U.S. PATENT DOCUMENTS

| | | | | |
|---|---|---|---|---|
| 2010/0252348 | A1* | 10/2010 | Ueda ...................... | B60K 23/04 180/244 |
| 2016/0144739 | A1* | 5/2016 | Ando .................... | B60W 20/00 701/22 |
| 2025/0042262 | A1* | 2/2025 | Yaguchi ............... | B60K 17/348 |

FOREIGN PATENT DOCUMENTS

JP        2019-103249 A      6/2019

OTHER PUBLICATIONS

The International Search Report (PCT/ISA/210) issued in PCT/JP2023/025523, mailed on Sep. 19, 2023.
(Continued)

*Primary Examiner* — Tisha D Lewis
(74) *Attorney, Agent, or Firm* — Birch, Stewart, Kolasch & Birch, LLP

(57) ABSTRACT

A design method for output control of a left driving source and a right driving source in a vehicle. The design method includes: preparing a sum model modeling motion states while the vehicle is running straight, and a difference model modeling motion states while the vehicle is cornering; calculating an equivalent sum value corresponding to a sum of a left-axle input/output including an input parameter or an
(Continued)

output parameter of the left driving system and a right-axle input/output including an input parameter or an output parameter of the right driving system (A1), and an equivalent difference value corresponding to a difference between the left-axle input/output and the right-axle input/output (A2); grasping motion states while the vehicle is running straight by applying the equivalent sum value to the sum model (A3); and grasping motion states by applying the equivalent difference value to the difference model (A4).

10 Claims, 9 Drawing Sheets

(51) Int. Cl.
  *B60W 40/10* (2012.01)
  *B60W 50/00* (2006.01)

(56) References Cited

OTHER PUBLICATIONS

The Written Report of the International Searching Authority (PCT/ISA/237) issued in PCT/JP2023/025523, mailed on Sep. 19, 2023.
International Preliminary Report on Patentability and Written Opinion of the International Searching Authority for International Application No. PCT/JP2023/025523, dated Feb. 27, 2025, with an English translation.

* cited by examiner

METHOD AND VEHICLE CONTROL DEVICE

TECHNICAL FIELD

The embodiment discussed herein relates to a design method and a vehicle control device for output control of a driving source of a vehicle.

BACKGROUND TECHNIQUE

Conventionally, for a vehicle provided with multiple driving sources, a method has been known in which an operating state of each driving source is controlled while suppressing vibration of a driving power transmission system by using a vehicle model that models the behavior of the driving power transmission system (see Patent Document 1).

PRIOR ART DOCUMENT

Patent Document

[Patent Document 1] JP 2019-103249 A

SUMMARY OF THE INVENTION

Problems to be Solved by Invention

The behavior of the driving power transmission system while the vehicle is running straight is different from the behavior while the vehicle is cornering. For the above, there is need to construct a control to deal with a vehicle while running straight and a control to deal with the vehicle while cornering. Constructing respective controls for the left and right driving systems would result in a complex control configuration. In addition, the traveling state of a vehicle is sometimes a combined state in which a running-straight state and a cornering state are mixed, which makes it difficult to enhance the controllability.

With the foregoing problems in view, one of the objects of the embodiment is to provide a design method and a vehicle control device that achieve preferable control with a simple configuration. In addition to this object, actions and effects which are derived from each configuration of "Embodiment to Carry out Invention" to be described below and which conventional technique does not attain are regarded as other objects of the present disclosure.

Means to Solve Problems of Invention

The disclosed design method and vehicle control device can be achieved in the embodiment and the application to be disclosed below and solve at least some of the above problems.

The disclosed design method is one for output control of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel. The design method includes: preparing a sum model modeling motion states of the left driving system, the right driving system, the left driving source, and the right driving source while the vehicle is running straight, and a difference model modeling motion states of the left driving system, the right driving system, the left driving source, and the right driving source while the vehicle is cornering; calculating an equivalent sum value corresponding to a sum of a left-axle input/output including an input parameter or an output parameter of the left driving system and a right-axle input/output including an input parameter or an output parameter of the right driving system, and an equivalent difference value corresponding to a difference between the left-axle input/output and the right-axle input/output; grasping motion states of the left driving system and the right driving system while the vehicle is running straight by applying the equivalent sum value to the sum model; and grasping motion states of the left driving system and the right driving system while the vehicle is cornering by applying the equivalent difference value to the difference model.

Additionally, the disclosed vehicle control device is a device for output control of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel. The vehicle control device includes: a calculator that calculates an equivalent sum value corresponding to a sum of a left-axle input/output including an input parameter or an output parameter of the left driving system and a right-axle input/output including an input parameter or an output parameter of the right driving system, and an equivalent difference value corresponding to a difference between the left-axle input/output and the right-axle input/output; and a storing unit that stores a sum model modeling motion states of the left driving system, the right driving system, the left driving source, and the right driving source while the vehicle is running straight, and a difference model modeling motion states of the left driving system, the right driving system, the left driving source, and the right driving source while the vehicle is cornering, the equivalent sum value being applied to the sum model, the equivalent difference value being applied to the difference model.

Effect of Invention

The disclosed design method and vehicle control device can precisely grasp behaviors of driving systems while the vehicle is running straight by applying an equivalent sum value to a sum model, and can precisely grasp behaviors of the driving systems while the vehicle is cornering by applying an equivalent difference value to a difference model. Accordingly, the method and the device can precisely grasp the state (behavior) of a driving system that have a different characteristic between a running-straight state and a cornering state of the vehicle, and can design control having preferable controllability with a simple configuration.

EMBODIMENT TO CARRY OUT INVENTION

The control designed in the disclosed design method is implemented in a vehicle, and is applied to, for example, the disclosed vehicle control device. Examples of the type of vehicle that is to implement this control are an engine vehicle (a gasoline-powered vehicle, a diesel-powered vehicle), an electric vehicle, and a hybrid vehicle. The vehicle is an automobile that travels by driving left and right wheels (left and right driving wheels) using at least one driving source (e.g., an internal combustion engine or a motor), and is preferably an automobile that travels by driving left and right wheels (left and right drive wheels) using multiple driving sources. Here, one of the multiple driving sources is referred to as a left driving source, and another one of the driving sources is referred to as a right driving source. In addition, one of the left and right wheels positioned on the left side of the vehicle is referred to as a left wheel, and the other is referred to as a right wheel. The disclosed design method and vehicle control device are suitable for use in designing a control to be implemented in a vehicle provided with a left driving system including a left axle and a left wheel to which motion power from the left driving source is transmitted and a right driving system including a right axle and a right wheel to which motion power from the right driving source is transmitted, and also for use in controlling the vehicle.

The layout of each of the left driving source and the right driving source may or may not be set to correspond to the left-right direction determined based on the forward-traveling direction of the vehicle. The left driving system and the right driving system may operate independently of each other, or may be connected to each other via a transmission mechanism or a power distributing mechanism. The disclosed design method and vehicle control device can also be used to design a control that is to be implemented in an in-wheel motor vehicle that drives the left and right wheels with respective different motors and control of the vehicle, or to a design a control to be implemented in a torque vectoring vehicle in which the left and right wheels can transmit a driving force and a torque to each other.

EMBODIMENT

[1. Configuration]

Figure 1:
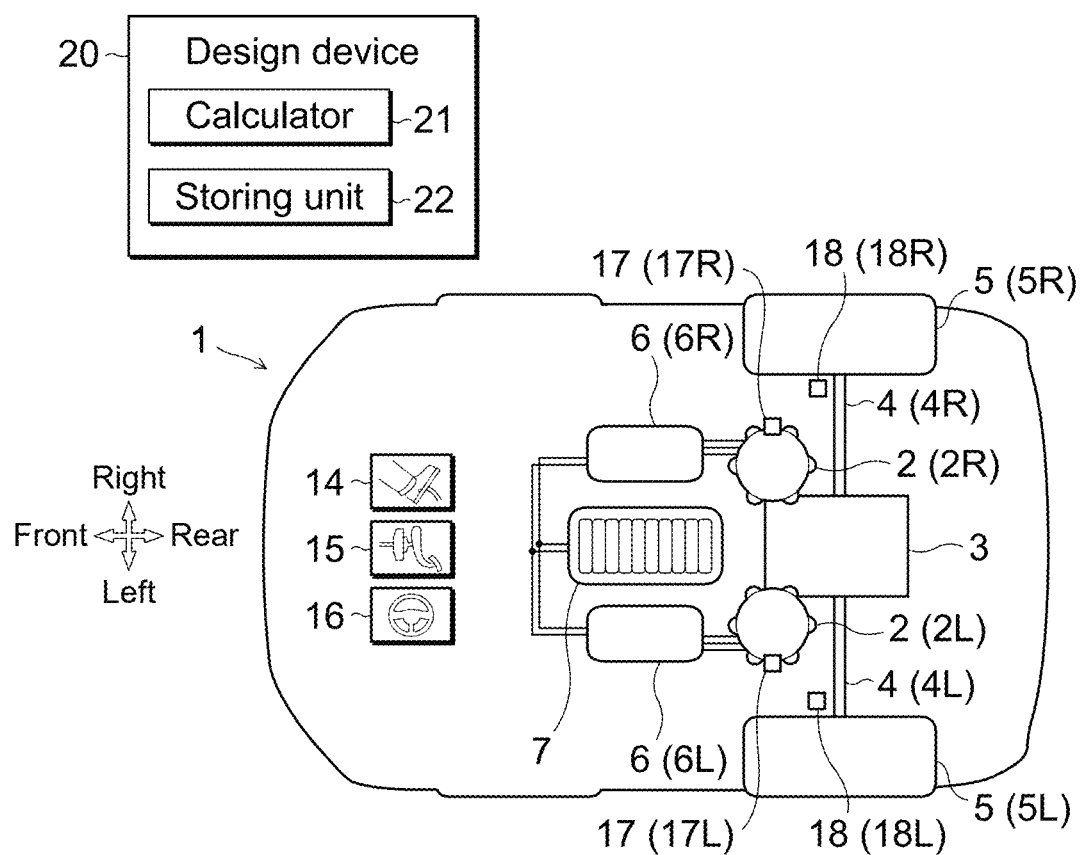
FIG. 1 is a block diagram showing a configuration of a vehicle control device and a vehicle.
Figure 2:
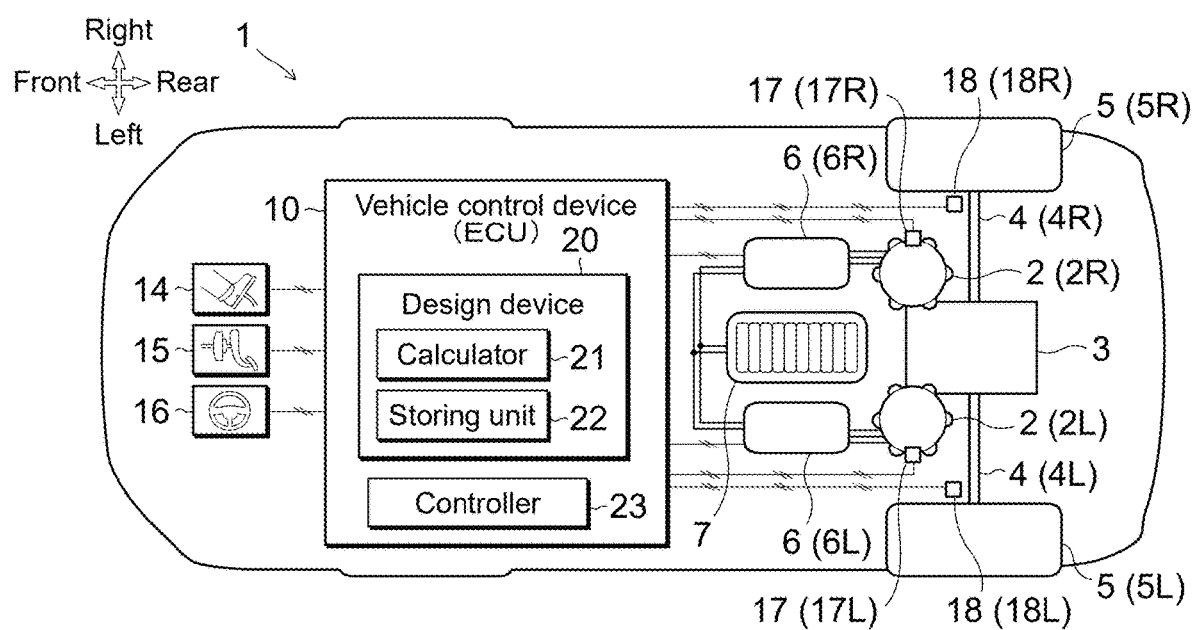
FIG. 2 is a block diagram showing a configuration of the vehicle control device being mounted on the vehicle.

A configuration of a design device 20 that uses the design method according to an embodiment is illustrated in FIGS. 1 and 2. The design device 20 is a device (computer) for designing a control to be implemented in the vehicle 1. Each of FIGS. 1 and 2 shows the configuration of a prospective vehicle 1 as well as the design device 20. The designed control can be applied to the prospective vehicle 1. As shown in FIG. 1, in a design stage of the control, the control may be designed using the design device 20 provided independently of the vehicle 1. Alternatively, as shown in FIG. 2, incorporating the function of the design device 20 in the vehicle control device 10 (ECU) makes it possible to utilize the function of the design device 20 also in actual control of the vehicle 1 as well as the design of the control.

The vehicle 1 shown in FIGS. 1 and 2 includes left and right wheels 5 (wheels) aligned side by side in the vehicle width direction, a power distributing mechanism 3 (differential mechanism) that applies a torque difference to the left and right wheels 5, and a pair of motors 2 connected to the power distributing mechanism 3. In the drawing illustrating the embodiment, alphabets R and L which are attached to the numerical signs represent the arrangement positions of the elements related to the signs (i.e., the positions on the right side and the left side of the vehicle 1). For example, the reference sign 5L represents one (left wheel) of the left and right wheels 5 located on the left side of the vehicle 1, and the reference sign 5R represents the other (right wheel) located on the right side. The left and right wheels 5 may be positioned anywhere in the front-rear direction, and may be front wheels or rear wheels of the vehicle 1.

Each motor 2 (driving source) has a function of driving at least either one of the front wheels and the rear wheels of the vehicle 1, and can have a function of driving all four wheels. Of the pair of motors 2, one arranged on the left side is a left motor 2L (left driving source), and the other arranged on the right side is a right motor 2R (right driving source). The left motor 2L and the right motor 2R operate independently of each other, and may individually output driving forces having different magnitudes from each other. These motors 2 are connected to the power distributing mechanism 3 each via a pair of reduction mechanisms provided separately from each other.

The vehicle 1 includes the power distributing mechanism 3 that amplifies the torque difference between the pair of motors 2 and distributes the torque difference to each of left and right wheels 5. The power distributing mechanism 3 of the present embodiment is a differential mechanism having a yaw control function (AYC (Active Yaw Control) function), and is interposed between an axle 4 (left axle 4L, left shaft) connected to the left wheel 5L and an axle 4 (right axle 4R, right shaft) connected to the right wheel 5R. The yaw control function is a function that adjusts the yaw moment by actively controlling the sharing ratio of the driving forces (driving torques) of the left and right wheels 5 and stabilizes the posture of the vehicle 1. Inside the power distributing mechanism 3, a planetary gear mechanism and a differential gear mechanism are incorporated, for example. A vehicle driving device including the pair of motors 2 and the power distributing mechanism 3 is also referred to as a DM-AYC (Dual Motor AYC) device.

Figure 3:
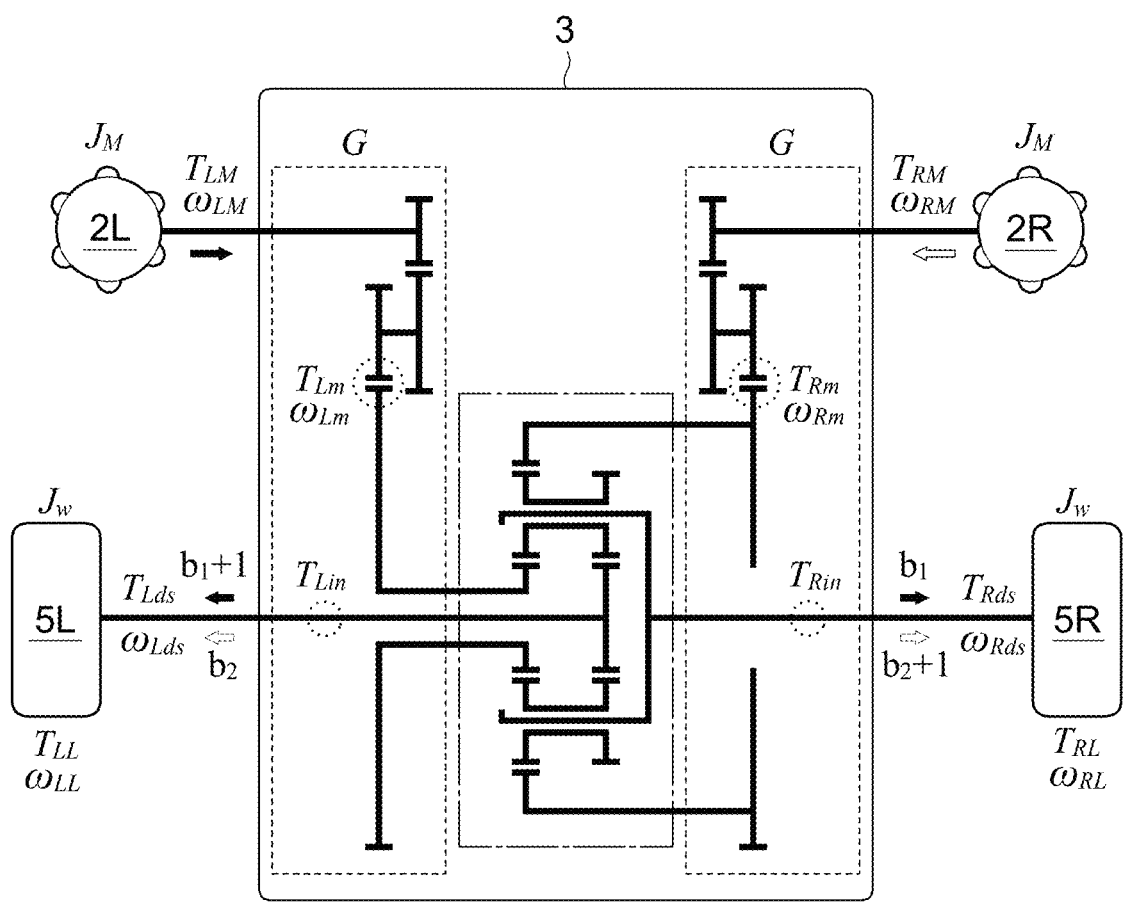
FIG. 3 is a skeleton diagram showing an example of a configuration of a driving system of the vehicle.

As shown in FIG. 3, the power distributing mechanism 3 includes the pair of reduction mechanisms (gear trains surrounded by dashed lines in FIG. 3) that reduces the rotational speeds of the motors 2 and a transmission mechanism (gear trains surrounded by one-dot dashed lines in FIG. 3). Each reduction mechanism is a mechanism that increases the torque by reducing the torque (driving force) output from the corresponding motor 2. The reduction ratio G of the reduction mechanism is appropriately set according to the output characteristic and the performance of the motor 2. If the torque performances of the motors 2 are sufficiently high, the reduction mechanisms may be omitted. The transmission mechanism is a mechanism that amplifies the difference between torques transmitted to the left and right wheels 5.

The transmission mechanism of the power distributing mechanism 3 shown in FIG. 3 includes a pair of planetary gear mechanisms. These planetary gear mechanisms have a structure in which planetary gears provided on respective carriers are connected to each other and also the rotation shafts of the planetary gears. Each carrier supports the planetary gears such that the planetary gears can rotate and revolve around a sun gear. Further, the driving forces transmitted from the left and right motors 2 are inputted into the ring gear and the sun gear of one of the planetary gear mechanisms. The driving forces transmitted to the left and right wheels 5 are taken out from the sun gear and the carrier of the other planetary gear mechanism. Note that the structure of the power distributing mechanism 3 shown in FIG. 3 is merely exemplary for achieving the yaw control function, and can be replaced with another known structures.

In FIG. 3, the symbol $J_M$ represents motor inertia (moment of inertia of the motors 2) and the symbol $J_w$ represents wheel inertia (moment of inertia of the left and right wheels 5). Also, in relation to the parameters of a left driving system, the symbol $T_{LM}$ represents a left-motor input torque, the symbol $T_{Lm}$ represents a left-motor input torque reduced by the reduction mechanism, the symbol $\omega_{LM}$ represents a left-motor angular speed, the symbol $\omega_{Lm}$ represents a left-motor angular speed reduced by the reduction mechanism, the symbol $T_{Lin}$ represents a left driving-side torque, the symbol $T_{Lds}$ represents a left-axle torque, the symbol $T_{LL}$ represents a left-wheel load-side torque, the symbol $\omega_{Lds}$ represents a left driving-side angular speed, and the symbol $\omega_{LL}$ represents a left-wheel angular speed. Similarly, in relation to the parameters of a right driving system, the symbol $T_{RM}$ represents a right-motor input torque, the symbol $T_{Rm}$ represents a right-motor input torque reduced by the reduction mechanism, the symbol $\omega_{RM}$ represents a right-motor angular speed, the symbol $\omega_{Rm}$ represents a right-motor angular speed reduced by the reduction mechanism, the symbol $T_{Rin}$ represents a right driving-side torque, the symbol $T_{Rds}$ represents a right-axle torque, the symbol $T_{RL}$ represents a right-wheel load-side torque, the symbol $\omega_{Rds}$ represents a right driving-side angular speed, and the symbol $\omega_{RL}$ represents a right-wheel angular speed.

Figure 4:
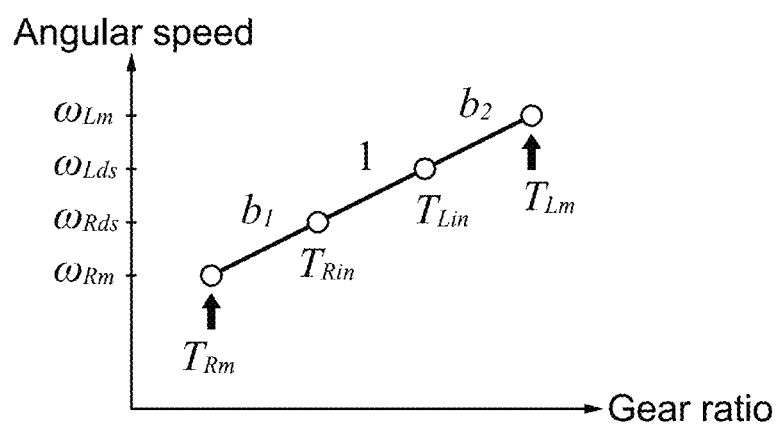
FIG. 4 is a speed graph of a power distributing mechanism of a vehicle having the configuration of FIG. 3.

FIG. 4 is a speed graph of the power distributing mechanism 3. The symbols $b_1$, $b_2$ shown in FIGS. 3 and 4 represent torque difference amplification ratios (reduction ratios, differential reduction ratios) determined according to the configuration of the gears incorporated in the power distributing mechanism 3. The torque difference amplification ratio related to motion power transmission from the left motor 2L to the right wheel 5R is represented by $b_1$ and the torque difference amplification ratio related to motion power transmission from the left motor 2L to the left wheel 5L is represented by $b_1+1$. In addition, the torque difference amplification ratio related to motion power transmission from the right motor 2R to the left wheel 5L is represented by $b_2$ and the torque difference amplification ratio related to motion power transmission from the right motor 2R to the right wheel 5R is represented by $b_2+1$.

As shown in FIGS. 1 and 2, the pair of motors 2 are electrically connected to a battery 7 via respective inverters 6 (6L, 6R). Each inverter 6 is a converter (DC-AC inverter) that mutually converts the power (DC power) of a DC circuit on the side of the battery 7 and the power (AC power) of the AC circuits on the side of the motors 2. The battery 7 is, for example, a lithium-ion secondary battery or a nickel-metal hydride secondary battery, and is a secondary battery capable of supplying a high-voltage DC current of several hundred volts. While the motors 2 are power running, the DC power is converted into AC power by the inverters 6 and the converted AC power is then supplied to the motors 2. At the time of power generation of the motors 2, the generated electric power is converted into DC power by the inverters 6 and is charged into the battery 7. The operating status of each inverter 6 is controlled by the vehicle control device 10.

The vehicle control device 10 is one of electronic control units (ECUs) mounted on the vehicle 1. The vehicle control device 10 has a function of controlling outputs of the left motor 2L (left driving source) and the right motor 2R (right driving source) in the vehicle 1 provided with the left driving system including the left axle 4L and the left wheel 5L to which motion power from the left motor 2L is transmitted and the right driving system including the right axle 4R and the right wheel 5R to which motion power from the right motor 2R is transmitted.

The vehicle control device 10 includes a processor (central processing unit), a memory (main memory), a storage device (storage), an interface device, and the like, which do not appear in the drawings, and these elements are communicably coupled to each other via an internal bus. The contents of the determination and the control performed by the vehicle control device 10 are recorded and stored as firmware or an application program in the memory, and when the program is to be executed, the contents of the program are expanded in a memory space and executed by the processor.

To the vehicle control device 10, an accelerator position sensor 14, a brake sensor 15, a steering sensor 16, resolvers 17, and wheel speed sensors 18 are connected. The accelerator position sensor 14 is a sensor that detects the amount (accelerator opening) of depressing of the accelerator pedal and the depression speed. The brake sensor 15 is a sensor that detects the amount (brake pedal stroke) of depressing of the brake pedal and the depression speed. The steering sensor 16 is a sensor that detects a steering angle (actual steering angle or steering angle of the steering wheel) of the left and right wheels 5.

The resolvers 17 (17L, 17R) are sensors that detect the angular speeds of the motors 2 and are provided one for each of the pair of motors 2. Each resolver 17 outputs data of a rotational angle of the motor 2 in the form of a two-phase AC voltage. The angular speed of the motor 2 is grasped from the chronological change of the AC voltage. The wheel speed sensors 18 (18L, 18R) are sensors that detect the angular speeds of the axles 4. The vehicle control device 10 controls the operating status of the inverters 6 (6L, 6R) on the basis of the information detected by the above sensors 14 to 18 and thereby controls the outputs of the pair of motors 2 (2L, 2R). The resolvers 17 may be replaced by other sensors (e.g., hall sensors and encoders) different in internal structure and operation principle.

[2. Design Device]

Figure 5:
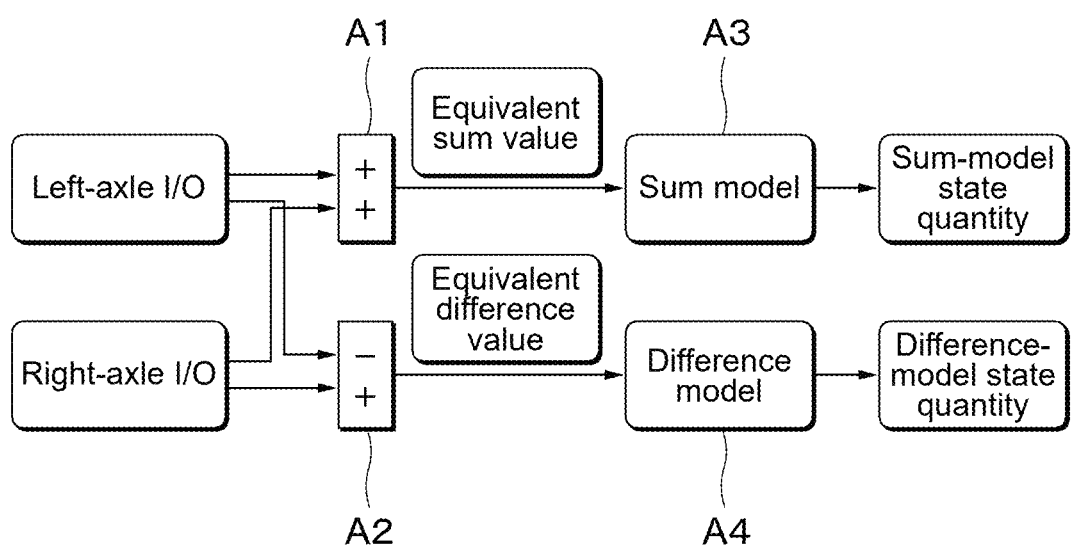
FIG. 5 is a block diagram showing a flow of a design method.

FIG. 5 is a schematic block diagram illustrating a flow of a design method executed by the design device 20. In the storage device of the design device 20, a sum model and a difference model are stored in advance. This means that, in the present design method, a sum model and a difference model are first prepared. The sum model models motion states of the left driving system, the right driving system, the left driving source (motor 2L), and the right driving source (motor 2R) while the vehicle 1 is running straight, and the difference model models motion states of the left driving system, the right driving system, the left driving source (motor 2L), and the right driving source (motor 2R) while the vehicle 1 is cornering.

As shown in FIG. 5, application of an equivalent sum value to the sum model makes it possible to grasp motion states of the left driving system and the right driving system while the vehicle 1 is running straight, and application of an equivalent difference value to the difference model makes it possible to grasp motion states of the left driving system and the right driving system while the vehicle 1 is cornering. Specifically, when being applied (inputted) with the equivalent sum value including an input element, the sum model outputs an equivalent sum value (an equivalent sum value including an output element and hereinafter referred to as a "sum-model state quantity") representing motion states of the left driving system and the right driving system while the vehicle 1 is running straight. Similarly, when being applied (inputted) with the equivalent difference value including an input element, the difference model outputs an equivalent difference value (an equivalent difference value including an output element and hereinafter referred to as a "difference-model state quantity") representing motion states of the left driving system and the right driving system while the vehicle 1 is cornering.

The equivalent sum value is a generic term for a value corresponding to the sum of a left-axle I/O (input and output) including an input parameter or an output parameter of the left driving system (a parameter representing a behavior of the left driving system) and a right-axle I/O including an input parameter or an output parameter of the right driving system (a parameter representing a behavior of the right driving system). The equivalent sum value may be not only a simple sum but also a product of the sum and a predetermined coefficient or the half the sum (arithmetic mean value). The equivalent difference value is a generic term for a value corresponding to the difference between the left-axle I/O and the right-axle I/O. The equivalent difference value may be not only a simple difference but also a product of the difference and a predetermined coefficient.

Step A1 in FIG. 5 corresponds to a step of calculating the equivalent sum value corresponding to the sum of the left-axle I/O and the right-axle I/O. The equivalent sum value calculated in this step is applied to the sum model in Step A3 in FIG. 5. Consequently, a sum-model state quantity representing the motion states of the left driving system and the right driving system while the vehicle 1 is running straight is obtained, so that the motion state of the vehicle 1 while running straight can be precisely grasped. Step A2 in FIG. 5 corresponds to a step of calculating the equivalent difference value corresponding to the difference between the left-axle I/O and the right-axle I/O. The equivalent difference value calculated in this step is applied to the difference model in Step A4 in FIG. 5. Consequently, a difference-model state quantity representing the motion states of the left driving system and the right driving system while the vehicle 1 is cornering is obtained, so that the motion state of the vehicle 1 while cornering can be precisely grasped.

Next, description will now be made in relation to a specific configuration to perform the above-described control. As shown in FIGS. 1 and 2, a calculator 21 and a storing unit 22 are provided inside the design device 20. Further, as shown in FIG. 2, if the design device 20 is incorporated in the vehicle control device 10, the control unit 23 is provided in the vehicle control device 10. These elements are shown by classifying the functions of the design device 20 and the vehicle control device 10 for convenience. These elements may be described as independent programs for implementing the functions of the respective elements. Alternatively, these elements may be described as a combined program of multiple elements being combined.

The calculator 21 calculates the equivalent sum value and the equivalent difference value. The equivalent sum value and the equivalent difference value are calculated based on a left-axle I/O and a right-axle I/O corresponding to the left-axle I/O. Examples of the left-axle I/O include the left-motor input torque $T_{LM}$, the (reduced) left-motor input torque $T_{Lm}$, the left driving-side torque $T_{Lin}$, the left-axle torque $T_{Lds}$, the left-wheel load-side torque $T_{LL}$, the left-motor angular speed $\omega_{LM}$, the (reduced) left-motor angular speed $\omega_{Lm}$, the left driving-side angular speed $\omega_{Lds}$, the left-wheel angular speed $\omega_{LL}$, the left-wheel nominal slip ratio $\lambda_{Ln}$, and the left-wheel nominal inertia $J_{LL}$. Similarly, examples of the right-axle I/O include the right-motor input torque $T_{RM}$, the (reduced) right-motor input torque $T_{Rm}$, the right driving-side torque $T_{Rin}$, the right-axle torque $T_{Rds}$, the right-wheel load-side torque $T_{RL}$, the right-motor angular speed $\omega_{RM}$, the (reduced) right-motor angular speed $\omega_{Rm}$, the right driving-side angular speed $\omega_{Rds}$, the right-wheel angular speed $\omega_{RL}$, the right-wheel nominal slip ratio $\lambda_{Rn}$, and the right-wheel nominal inertia $J_{RL}$.

Examples of the equivalent sum value include a sum-mode motor input torque $T_{SM}$, a (reduced) sum-mode motor input torque $T_{Sm}$, a sum-mode driving-side torque $T_{Sin}$, a sum-mode axle torque $T_{Sds}$, a sum-mode wheel load-side torque $T_{SL}$, a sum-mode motor angular speed $\omega_{SM}$, a (reduced) sum-mode motor angular speed $\omega_{Sm}$, a sum-mode driving-side angular speed $\omega_{Sds}$, a sum-mode wheel angular speed $\omega_{SL}$, a sum-mode wheel nominal slip ratio $\lambda_{Sn}$, a sum-mode wheel nominal inertia $J_{SL}$. Similarly, examples of the equivalent difference value include a difference-mode motor input torque $T_{DM}$, a (reduced) difference-mode motor input torque $T_{Dm}$, a difference-mode driving-side torque $T_{Din}$, a difference-mode axle torque $T_{Dds}$, a difference-mode wheel load-side torque $T_{DL}$, a difference-mode motor angular speed $\omega_{DM}$, a (reduced) difference-mode motor angular speed $\omega_{Dm}$, a difference-mode driving-side angular speed $\omega_{Dds}$, a difference-mode wheel angular speed $\omega_{DL}$, a difference-mode wheel nominal slip ratio $\lambda_{Dn}$, difference-mode wheel nominal inertia $J_{DL}$.

Each of the sum-mode motor input torque $T_{SM}$ and the difference-mode motor input torque $T_{DM}$ is calculated based on the left-motor input torque $T_{LM}$ and the right-motor input torque $T_{RM}$. Further, each of the (reduced) sum-mode motor input torque $T_{Sm}$ and the (reduced) difference-mode motor input torque $T_{Dm}$ are calculated based on the (reduced) left-motor input torque $T_{Lm}$ and the (reduced) right-motor input torque $T_{Rm}$. The following calculation equations are used when the half of the sum of the left-axle I/O and the right-axle I/O is defined as the equivalent sum value and the half of the difference between the left-axle I/O and the right-axle I/O is defined as the equivalent difference value.

[Math. 1]

$$\begin{pmatrix} T_{SM} \\ T_{DM} \end{pmatrix} = \begin{pmatrix} \frac{1}{2} & \frac{1}{2} \\ \frac{1}{2} & -\frac{1}{2} \end{pmatrix} \begin{pmatrix} T_{RM} \\ T_{LM} \end{pmatrix},$$

$$\begin{pmatrix} T_{Sm} \\ T_{Dm} \end{pmatrix} = \begin{pmatrix} \frac{1}{2} & \frac{1}{2} \\ \frac{1}{2} & -\frac{1}{2} \end{pmatrix} \begin{pmatrix} T_{Rm} \\ T_{Lm} \end{pmatrix},$$

$$\begin{pmatrix} T_{Sin} \\ T_{Din} \end{pmatrix} = \begin{pmatrix} \frac{1}{2} & \frac{1}{2} \\ \frac{1}{2} & -\frac{1}{2} \end{pmatrix} \begin{pmatrix} T_{Rin} \\ T_{Lin} \end{pmatrix}$$

$$\begin{pmatrix} T_{Sds} \\ T_{Dds} \end{pmatrix} = \begin{pmatrix} \frac{1}{2} & \frac{1}{2} \\ \frac{1}{2} & -\frac{1}{2} \end{pmatrix} \begin{pmatrix} T_{Rds} \\ T_{Lds} \end{pmatrix},$$

$$\begin{pmatrix} T_{SL} \\ T_{DL} \end{pmatrix} = \begin{pmatrix} \frac{1}{2} & \frac{1}{2} \\ \frac{1}{2} & -\frac{1}{2} \end{pmatrix} \begin{pmatrix} T_{RL} \\ T_{LL} \end{pmatrix},$$

-continued $$\begin{pmatrix} \omega_{SM} \\ \omega_{DM} \end{pmatrix} = \begin{pmatrix} \frac{1}{2} & \frac{1}{2} \\ \frac{1}{2} & -\frac{1}{2} \end{pmatrix} \begin{pmatrix} \omega_{RM} \\ \omega_{LM} \end{pmatrix}$$

$$\begin{pmatrix} \omega_{Sm} \\ \omega_{Dm} \end{pmatrix} = \begin{pmatrix} \frac{1}{2} & \frac{1}{2} \\ \frac{1}{2} & -\frac{1}{2} \end{pmatrix} \begin{pmatrix} \omega_{RM} \\ \omega_{LM} \end{pmatrix},$$

$$\begin{pmatrix} \omega_{Sds} \\ \omega_{Dds} \end{pmatrix} = \begin{pmatrix} \frac{1}{2} & \frac{1}{2} \\ \frac{1}{2} & -\frac{1}{2} \end{pmatrix} \begin{pmatrix} \omega_{Rds} \\ \omega_{Lds} \end{pmatrix},$$

$$\begin{pmatrix} \omega_{SL} \\ \omega_{DL} \end{pmatrix} = \begin{pmatrix} \frac{1}{2} & \frac{1}{2} \\ \frac{1}{2} & -\frac{1}{2} \end{pmatrix} \begin{pmatrix} \omega_{RL} \\ \omega_{LL} \end{pmatrix}$$

The storing unit 22 stores the sum model and the difference model. The sum model represents motion states of the left driving system, the right driving system, the left driving source (left motor 2L), and the right driving source (right motor 2R) while the vehicle 1 is running straight. The difference model represents motion states of the left driving system, the right driving system, the left driving source (left motor 2L), and the right driving source (right motor 2R) while the vehicle 1 is cornering. Before describing the sum model and the difference model, the schematic configurations of the left driving system and the right driving system of vehicle 1 will now be described.

Figure 6:
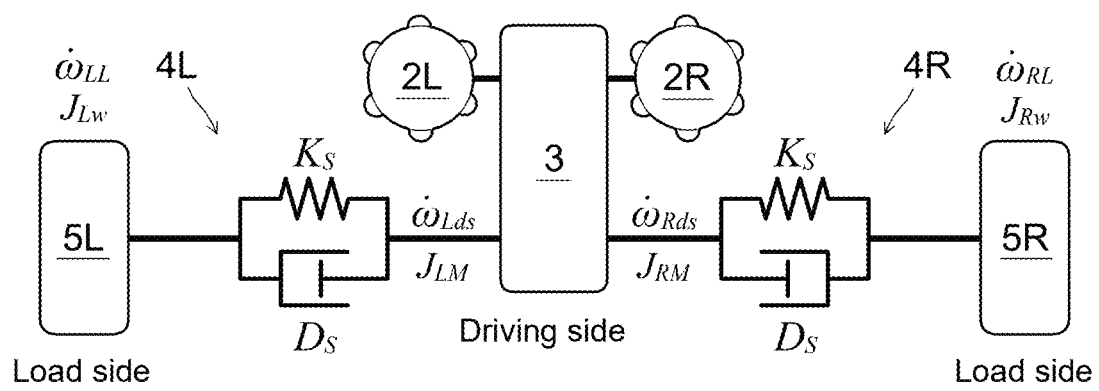
FIG. 6 is a schematic diagram schematically showing a left driving system and a right driving system of the vehicle.

FIG. 6 is a schematic diagram of the configurations of the left driving system and the right driving system of the vehicle 1. Each of the left axle 4L and the right axle 4R can be regarded as a structure in which a spring (axle stiffness $K_s$) and a damper (axle viscosity $D_s$) are connected in parallel. In FIG. 6, the symbol $J_{LM}$ represents inertia of the side of the power distributing mechanism 3 (driving side) against the left axle 4L, the symbol $J_{Lw}$ represents inertia of the side of the left wheel 5L (load side) against the left axle 4L, the symbol $J_{RM}$ represents inertia of the side of the power distributing mechanism 3 (driving side) against the right axle 4R, and the symbol $J_{Rw}$ is inertia of the side of the right wheel 5R (load side) against the right axle 4R. FIG. 6 also shows a differential value (left driving-side angular acceleration) of the left driving-side angular speed $\omega_{Lds}$, a differential value (left-wheel angular acceleration) of the left-wheel angular speed $\omega_{LL}$, a differential value (right driving-side angular acceleration) of the right driving-side angular speed $\omega_{Rds}$, and a differential value (right-wheel angular acceleration) of the right-wheel angular speed $\omega_{RL}$.

Figure 7A:
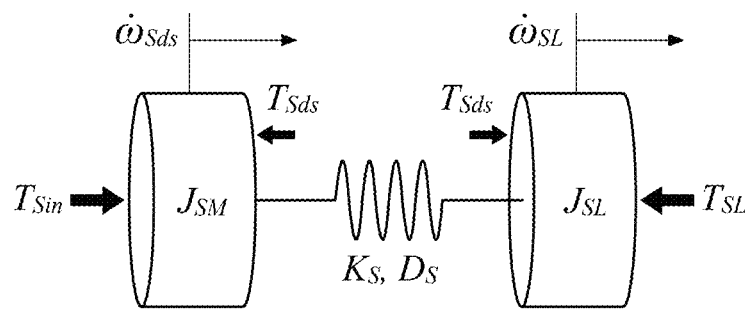
FIG. 7A is a schematic diagram of a sum model and FIG. 7B is a schematic diagram of a difference model.
Figure 7B:
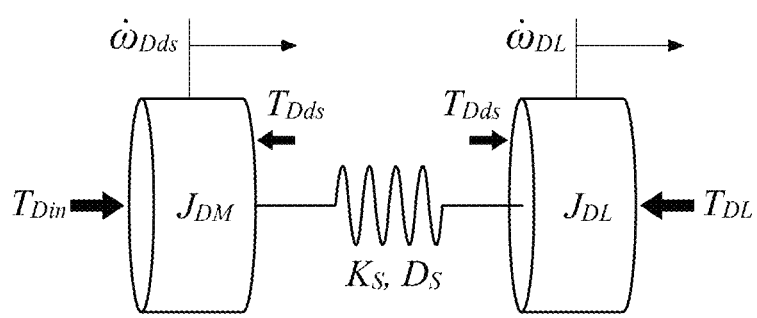

On the basis of the above schematic diagram, the configuration of the sum model is modeled to have the configuration shown in FIG. 7A, and the configuration of the difference model is modeled to have the configuration shown in FIG. 7B. The sum model is preferably used for damping control and slip control on the axle 4 and the left and right wheels 5 while the vehicle is running straight, and the difference model is preferably used for damping control and slip control on the axle 4 and the left and right wheels 5 while the vehicle is cornering. In this embodiment, both the sum model and the difference model are two-inertia system models, but each may alternatively be configured as a multi-inertia system model including three or more moments of inertia or spring dampers.

As shown in FIG. 7A, the sum model includes driving-side inertia $J_{SM}$, a spring damper designed with a stiffness $K_s$ and a viscosity $D_s$, and load-side inertia (sum-mode wheel nominal inertia) $J_{SL}$. The driving-side inertia $J_{SM}$ is calculated based on the inertia $J_M$ of the driving sources (left driving source and right driving source), and is, for example, expressed by the equation $J_{SM}=G^2 J_M$. The load-side inertia $J_{SL}$ is calculated based on a vehicle body weight M (calibrated in terms of a wheel). In the calculation of the driving-side inertia $J_{SM}$ and the load-side inertia $J_{SL}$, friction may also be considered. The equations of motion of the sum model are shown below.

[Math 2]

Equation of motion of driving side $$J_{SM}\dot{\omega}_{Sds} = T_{Sin} - T_{Sds}$$

Equation of motion of load side $$J_{SL}\dot{\omega}_{SL} = T_{Sds} - T_{SL}$$

Equation of motion of spring dumper system $$T_{Sds} = K_S \int (\omega_{Sds} - \omega_{SL}) + D_S (\omega_{Sds} - \omega_{SL})$$

As shown in FIG. 7B, the difference model includes driving-side inertia $J_{DM}$ corresponding to equivalent inertia when a left-right difference is generated (i.e., while the vehicle 1 is cornering), the spring damper designed with the stiffness $K_s$ and the viscosity $D_s$, and load-side inertia (difference-mode wheel nominal inertia) $J_{DL}$. The driving-side inertia $J_{DM}$ is calculated based on the inertia $J_M$ of the driving sources (left driving source and right driving source) and the torque difference amplification ratios (e.g., $b_1$, $b_2$) of the power distributing mechanism 3, and is, for example, expressed by the equation $J_{DM}=(2b_1+1)^2 G^2 J_M$. The load-side inertia $J_{DL}$ is calculated based on the yaw inertia (calibrated in terms of a wheel) of the vehicle 1. In the calculation of the driving-side inertia $J_{DM}$ and the load-side inertia $J_{DL}$, friction may also be considered. The equations of motion of the difference model are shown below.

[Math 3]

Equation of motion of driving side $$J_{DM}\dot{\omega}_{Dds} = T_{Din} - T_{Dds}$$

Equation of motion of load side $$J_{DL}\dot{\omega}_{DL} = T_{Dds} - T_{DL}$$

Equation of motion of spring dumper system $$T_{Dds} = K_S \int (\omega_{Dds} - \omega_{DL}) + D_S (\omega_{Dds} - \omega_{DL})$$

By applying the equivalent sum value to the above sum model, the sum-model state quantity representing the motion states of the left driving system and the right driving system while the vehicle 1 is running straight is obtained. The sum-model state quantity includes one or more parameters of the equivalent sum value except for those applied to the sum model. For example, if the sum-mode wheel angular speed $\omega_{SL}$ and the sum-mode wheel nominal inertia $J_{Sn}$ are applied to the sum model, another equivalent sum value (e.g., sum-mode axle torque $T_{Sds}$) is obtained as the sum-model state quantity.

The same is applied to the difference model, and by applying the equivalent difference value to the difference model, difference-model state quantity representing the motion states of the left driving system and the right driving system while the vehicle 1 is cornering are obtained. The difference-model state quantity includes one or more parameters of the equivalent difference value except for those applied to the difference model. For example, if the difference-mode wheel angular speed $\omega_{DL}$ and the difference-mode wheel nominal inertia $J_{Dn}$ are applied to the difference model, another equivalent sum (sic, correctly "difference") value (e.g., difference-mode axle torque $T_{Dds}$) is obtained as difference-model state quantity.

The controller 23 controls the outputs of the left motor 2L and the right motor 2R using the sum-model state quantity and the difference-model state quantity. The controller 23 controls the operating states of inverters 6 by driving the pair of motors 2 such that the sum-model state quantity and the difference-model state quantity can be obtained (that is, such that both the sum-model state quantity and the difference-model state quantity can be both achieved). This makes the controller 23 possible to conduct accurate control such that the motion states of the left driving system and the right driving system become desired state.

Here, description will now be made in relation to the case where application of the sum-mode wheel angular speed $\omega_{SL}$ and the difference-mode wheel angular speed $\omega_{DL}$ calculated on the basis of target wheel speeds of the left and right wheels 5 to the sum model and the difference model obtains the sum-mode axle torque $T_{Sds}$, one of the sum-model state quantities, and the difference-mode axle torque $T_{Dds}$, one of the difference-model state quantities. The controller 23 calculates the torque to be outputted by each of the pair of motor 2 based on the sum-mode axle torque $T_{Sds}$ and the difference-mode axle torque $T_{Dds}$, and drives the pair of inverters 6 such that the calculated torques can be obtained.

The calculation of the sum-mode axle torque $T_{Sds}$ and the difference-mode axle torque $T_{Dds}$ can be achieved by performing an inverse operation to the arithmetic operation of the equivalent sum value and the equivalent difference value. For example, the torques of the respective motors 2 to be calculated are set to "the left-motor input torque $T_{LM}$ and the right-motor input torque $T_{RM}$". Then, the values of the left-motor input torque $T_{LM}$ and the right-motor input torque $T_{RM}$ are calculated which make the sum of the left-motor input torque $T_{LM}$ and the right-motor input torque $T_{RM}$ mach the sum-mode axis torque $T_{Sds}$ and also which make the difference between the left-motor input torque $T_{LM}$ and the right-motor input torque $T_{RM}$ match the difference-mode axle torque $T_{Dds}$. After that, the respective inverter 6 are driven such that the calculated left-motor input torque $T_{LM}$ and the right-motor input torque $T_{RM}$ can be obtained.

This makes the actual wheel speeds to accurately follow the target wheel speeds so that the controllability of the wheel speeds can be enhanced. In addition, since the wheel speeds easily match the target wheel speeds even if disturbance is input, the wheel speed are less likely to change suddenly when the frictional resistance of the traveling road surface and the driving forces change, and consequently the generation of slippage is suppressed.

As another example, description will now made in relation to the case where application of the sum-mode wheel load-side torque $T_{SL}$ and the difference-mode wheel load-side torque $T_{DL}$ calculated on the basis of target driving torques of the left and right wheels 5 to the sum model and the difference model obtains the sum-mode axle torque $T_{Sds}$, one of the sum-model state quantities, and the difference-mode axle torque $T_{Dds}$, one of the difference-model state quantities. The controller 23 calculates the torque to be outputted by each of the pair of motors 2 based on the sum-mode axle torque $T_{Sds}$ and the difference-mode axle torque $T_{Dds}$, and drives the pair of inverters 6 such that the calculated torques can be obtained.

This makes the actual driving torques of the left and right wheels 5 to accurately follow the target driving torques so that the controllability of the driving torques can be enhanced. Further, providing the sum model and the difference model independently of each other makes it easy to provide respective different characteristics to the sum-mode axle torque $T_{Sds}$ and the difference-mode axle torque $T_{Dds}$. For example, it is possible to impart a characteristic (a characteristic that does not include a resonance frequency component) that is less likely to generate resonance while the vehicle is running straight to the sum-mode axle torque $T_{Sds}$, and to impart a characteristic (a characteristic that does not include a resonance frequency component) that is less likely to generate resonance while the vehicle is cornering to the difference-mode axle torque $T_{Dds}$. This suppresses vibration in any traveling state.

3. Specific Examples of Sum Model and Difference Model

[A. Transfer Function of Load Side (Sum Model)]

Figure 8:
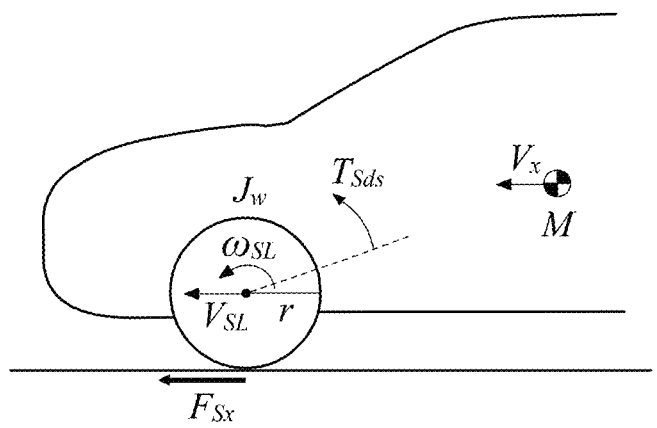
FIG. 8 is a schematic diagram considering the behavior of the vehicle while the vehicle is running straight.

FIG. 8 is a schematic diagram to derive load-side inertia while the vehicle 1 is running straight. Here, the vehicle body speed while the vehicle 1 is running straight is represented by the symbol $V_x$, the wheel speed (moving forward speed of the left and right wheels 5) is represented by the symbol $V_{SL}$, the vehicle body weight is represented by the symbol M, the wheel angular speed (sum-mode wheel angular speed) is represented by the symbol $\omega_{SL}$, the driving force of the left and right wheels 5 is represented by the symbol $F_{Sx}$, and the dynamic rolling radius of the wheel is represented by the symbol r. If the sum-mode wheel load-side torque $T_{SL}$ (the torque corresponding to the reaction force from the road surface or the driving force) is linearized on the assumption that the sum-mode wheel load-side torque $T_{SL}$ is determined by the sum-mode axle torque $T_{Sds}$ serving as the driving-side torque, the following equations hold.

[Math 4]

Relational equation between wheel angular speed $\omega_{SL}$ and torque $$\omega_{SL} = \frac{1}{J_{SL} \cdot s + D_L}(T_{Sds} - T_{SL})$$

Relational equation between driving force $F_{Sx}$ and sum-mode wheel load-side torque $T_{SL}$ $$T_{SL} = r \cdot F_{Sx}$$

Relational equation between vehicle body speed $V_x$ and driving force $F_{Sx}$ $$V_x = \frac{2}{M \cdot s} F_{Sx}$$

Relational equation between wheel speed $V_{SL}$ and wheel angular speed $\omega_{SL}$ $$V_{SL} = r \cdot \omega_{SL}$$

Sum-mode wheel nominal slip ratio $$\lambda_{Sn} = \frac{V_{SL} - V_x}{V_{SL}}$$

On the basis of the above equations, the transfer function on the load-side in the sum mode (a relational equation including a transfer function representing the input/output characteristic of the two-inertia system related to the sum model) can be obtained.

$$\omega_{SL} = \frac{T_{Sds}}{J_w + r^2 M(1 - \lambda_{Sn})/2} \cdot \frac{1}{s} = \frac{T_{Sds}}{J_{SL}} \cdot \frac{1}{s} \quad \text{[Math 5]}$$

Figure 9:
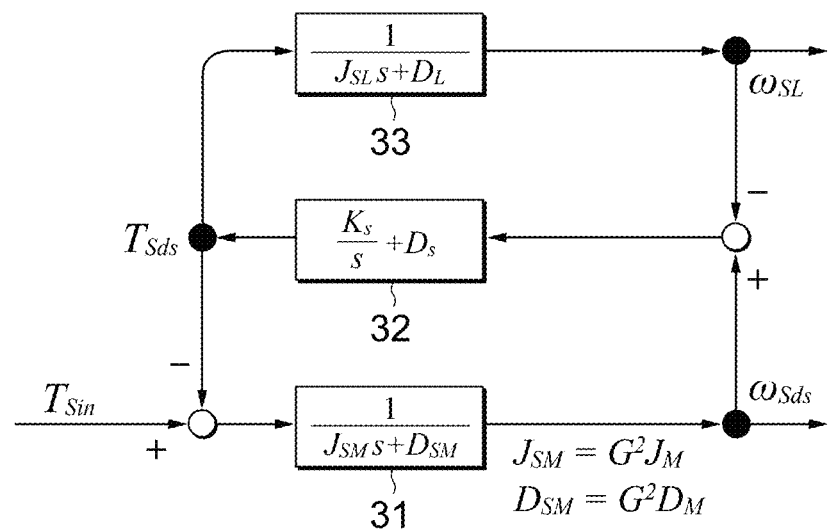
FIG. 9 is a schematic diagram showing a relationship between a torque and an angular speed while the vehicle is running straight.

FIG. 9 is a schematic diagram representing a relationship between a torque and an angular speed while the vehicle 1 is running straight. In FIG. 9, the symbol $J_{SM}$ represents the driving-side inertia, the symbol $J_M$ represents motor inertia, the symbol $D_{SM}$ represents a sum-mode driving-side viscosity, the symbol $D_M$ represents a motor viscosity, and the symbol $D_L$ represents a load-side viscosity.

The sum-mode driving-side angular speed $\omega_{Sds}$ is calculated by multiplying a value obtained by subtracting the sum-mode axle torque $T_{Sds}$ from the sum-mode driving-side torque $T_{Sin}$ with "$1/(J_{SM} \cdot S + D_{SM})$". Here, the equations $J_{SM} = G^2 J_M$ and $D_{SM} = G^2 D_M$ hold.

The sum-mode axle torque $T_{Sds}$ is calculated by multiplying a value obtained by subtracting the sum-mode wheel angular speed $\omega_{SL}$ from the sum-mode driving-side angular speed $\omega_{Sds}$ with "$(K_s/s) + D_s$". Here, the symbols $K_s$ and $D_s$ are the stiffness and the viscosity of the spring damper.

The sum-mode wheel angular speed $\omega_{SL}$ is calculated by multiplying the sum-mode axle torque $T_{Sds}$ by "$1/(J_{SL} \cdot S + D_L)$".

[B. Transfer Function of Load Side (Difference Model)]

The yaw rate, the dread, the difference between wheel speeds of the left and right wheels while the vehicle 1 is cornering are set to the symbol $\gamma$, the symbol d, and the symbol $V_{Dx}$, respectively. In addition, the symbol $V_x$ represents the vehicle speed, the symbol $V_{rlx}$ represents the left wheel reference wheel speed, and the symbol $V_{rrx}$ represents the right wheel reference wheel speed.

Considering the relationships between the yaw rate $\gamma$ and the difference-mode wheel angular speed $\omega_{DL}$ is considered on the assumption that the steering angle is zero, the following equations hold.

[Math 6]

Right wheel reference wheel speed $$V_{rrx} = V_x + \frac{d}{2}\gamma$$

Left wheel reference wheel speed $$V_{rlx} = V_x - \frac{d}{2}\gamma$$

Difference between wheel speeds of the left and right wheels $$V_{Dx} = \frac{V_{rrx} - V_{rlx}}{2} = \frac{d}{2}\gamma$$

Difference-mode wheel slip ratio $$\lambda_D = \frac{r \cdot \omega_{DL} - V_{Dx}}{r \cdot \omega_{DL}}$$

Relational equation between yaw rate and difference between wheel speeds of the left and right wheels $$\gamma = \frac{r}{d/2}(1 - \lambda_D)\omega_{DL}$$

In addition, equations of motion on the driving side in the difference mode, the yaw motion, and the lateral motion hold as follows. In the equations, the symbol $\delta_f$ represents the steering angle, the symbol ay represents a lateral acceleration, the symbol I represents yaw inertia of the vehicle 1, the symbol $C_f$ represents cornering power of the front wheel, the symbol $C_r$ represents cornering power of the rear wheel, and the symbol $I_f$ represents the distance between the center of gravity and the front axle, the symbol $I_r$ represents the distance between the center of gravity and the rear axle, the symbol $\beta$ represents a slip angle of the vehicle body, and the symbol $F_{Dx}$ represents a left-right difference of driving power, the symbol $\lambda_D$ represents a slip ratio in the difference model.

$$\omega_{DL} = \frac{1}{J_w \cdot s + D_L}(T_{Dds} - T_{DL}) \quad \text{[Math 7]}$$

$$T_{DL} = r \cdot F_{Dx}$$

$$I\gamma s = -2C_f l_f \left(\beta + \frac{l_f}{V}\gamma - \delta_f\right) + 2C_r l_r \left(\beta + \frac{l_r}{V}\gamma\right) + \frac{d}{2} \cdot 2F_{Dx}$$

$$a_y = V(\beta s + \gamma)$$

$$\gamma = \frac{r}{d/2}(1 - \lambda_D)\omega_{DL}$$

Assuming that the steering angle $\delta_f$ and the lateral acceleration $a_y$ are zeros in order to model the state of the transition from a running-straight state to a cornering state of the vehicle 1, the following transfer function on the load-side in the difference mode (a relational equation including a transfer function representing the input/output characteristic of the two-inertia system related to the difference model) can be obtained.

$$\frac{\omega_{DL}}{T_{Dds}} = \frac{s}{\left\{J_w + \frac{2r^2}{d^2}(1-\lambda_D)I\right\}s^2 + \left\{D_L + \frac{4r^2}{d^2V}(1-\lambda_D)(C_f l_f^2 + c_r l_r^2)\right\}s + \frac{4r^2}{d^2}(1-\lambda_D)(c_f l_f - c_r l_r)} \quad \text{[Math 8]}$$

$$= \frac{1}{J_{DL}s + D_{DL} + \frac{K_{DL}}{s}}$$

[C. Equation of Motion of Driving Side (Sum/Difference Models)]

In deriving the above sum model and difference model, the power distributing mechanism 3 may formulate the models as follows by using vector expressions.

Matrixes of respective gear ratios $$G = \begin{pmatrix} G & 0 \\ 0 & G \end{pmatrix}, B = \begin{pmatrix} b_2+1 & -b_2 \\ -b_1 & b_1+1 \end{pmatrix}$$

Angular speed vectors $$\omega_L = \begin{pmatrix} \omega_{RL} \\ \omega_{LL} \end{pmatrix}, \omega_{ds} = \begin{pmatrix} \omega_{Rds} \\ \omega_{Lds} \end{pmatrix}, \omega_M = GB\omega_{ds} = \begin{pmatrix} \omega_{RM} \\ \omega_{LM} \end{pmatrix}$$

Torque vectors $$T_{ds} = \begin{pmatrix} T_{Rds} \\ T_{Lds} \end{pmatrix}, T_M = \begin{pmatrix} T_{RM} \\ T_{LM} \end{pmatrix}, T_L = \begin{pmatrix} T_{RL} \\ T_{LL} \end{pmatrix}, T_{in} = B^T G T_M = \begin{pmatrix} T_{Rin} \\ T_{Lin} \end{pmatrix}$$

Dynamics of left and right wheels 5 (load side), driving side, and axles 4.

$$P_L = \begin{pmatrix} \frac{1}{J_{SL}s + D_{SL}} & 0 \\ 0 & \frac{1}{J_{DL}s + D_{DL}} \end{pmatrix},$$

$$P_M = \begin{pmatrix} \frac{1}{J_M s + D_M} & 0 \\ 0 & \frac{1}{J_M s + D_M} \end{pmatrix}$$

$$P_{DS} = \begin{pmatrix} D_s + \frac{K_s}{s} & 0 \\ 0 & D_s + \frac{K_s}{s} \end{pmatrix}$$

Establishing the equation of motion (sum and difference) on the driving side for each of the left and right sides using the above equations obtains the following result. In the equations, the symbol $Z_{11}$ represents the reduction ratio from the left driving source (left motor 2L) to the left shaft (left axle 4L), the symbol $Z_{22}$ represents the reduction ratio from the right driving source (right motor 2R) to the right shaft (right axle 4R), and the symbol $Z_c$ represents the reduction ratio from the left and right driving sources to the respective opposing shafts.

$$\begin{pmatrix} \omega_{Rds} \\ \omega_{Lds} \end{pmatrix} = \frac{G^{-2}P_M}{|Z|}\begin{pmatrix} Z_{22} & -Z_c \\ -Z_c & Z_{11} \end{pmatrix}\begin{pmatrix} T_{Rin} - T_{Rds} \\ T_{Lin} - T_{Lds} \end{pmatrix} \quad \text{[Math 10]}$$

$$Z^{-1} = B^{-1^T} B^{-1} =$$

$$\frac{1}{|Z|}\begin{pmatrix} Z_{22} & -Z_c \\ -Z_c & Z_{11} \end{pmatrix} = \frac{1}{(1+b_1+b_2)^2}\begin{pmatrix} b_1^2 + 2b_1 + b_2^2 + 1 & b_1^2 + b_1 + b_2^2 + b_2 \\ b_1^2 + b_1 + b_2^2 + b_2 & b_2^2 + 2b_2 + b_1^2 + 1 \end{pmatrix}$$

$$Z_{11} = b_2^2 + 2b_2 + b_1^2 + 1$$

$$Z_{22} = b_1^2 + 2b_1 + b_2^2 + 1$$

$$Z_c = -(b_1^2 + b_1 + b_2^2 + b_2)$$

Applying a matrix for conversion to the sum and difference modes to both sides of each of the above equations obtains the following equation.

$$\begin{pmatrix} \frac{1}{2} & \frac{1}{2} \\ \frac{1}{2} & -\frac{1}{2} \end{pmatrix}\begin{pmatrix} \omega_{Rds} \\ \omega_{Lds} \end{pmatrix} = \quad \text{[Math 11]}$$

$$\frac{G^{-2}P_M}{|Z|}\begin{pmatrix} \frac{1}{2} & \frac{1}{2} \\ \frac{1}{2} & -\frac{1}{2} \end{pmatrix}\begin{pmatrix} Z_{22} & -Z_c \\ -Z_c & Z_{11} \end{pmatrix}\begin{pmatrix} T_{Rin} - T_{Rds} \\ T_{Lin} - T_{Lds} \end{pmatrix} =$$

$$\frac{G^{-2}P_M}{2|Z|}\begin{pmatrix} Z_{22} - Z_c & Z_{11} - Z_c \\ Z_{22} + Z_c & -(Z_{11} + Z_c) \end{pmatrix}\begin{pmatrix} T_{Rin} - T_{Rds} \\ T_{Lin} - T_{Lds} \end{pmatrix}$$

Here, assuming $b_1 = b_2 = b$, the equations $Z_{11} - Z_c = Z_{22} - Z_c = |Z|$ and $Z_{11} + Z_c = Z_{22} + Z_c = 1$ hold. Therefore, the equations can be modified as follows and the equation of motion of the motors 2 that can deal with the sum and difference modes can be obtained. By dividing the equation of motion of the driving side into the equation of the sum mode and that of the difference mode, the two equations do not interfere with each other.

$$\begin{pmatrix} \frac{1}{2} & \frac{1}{2} \\ \frac{1}{2} & -\frac{1}{2} \end{pmatrix}\begin{pmatrix} \omega_{Rds} \\ \omega_{Lds} \end{pmatrix} = \frac{G^{-2}P_M}{2|Z|}\begin{pmatrix} |Z| & |Z| \\ 1 & -1 \end{pmatrix}\begin{pmatrix} T_{Rin} - T_{Rds} \\ T_{Lin} - T_{Lds} \end{pmatrix} = \quad \text{[Math 12]}$$

$$\frac{P_M}{G^2}\begin{pmatrix} 1 & 0 \\ 0 & \frac{1}{|Z|} \end{pmatrix}\begin{pmatrix} \frac{1}{2} & \frac{1}{2} \\ \frac{1}{2} & -\frac{1}{2} \end{pmatrix}\begin{pmatrix} T_{Rin} - T_{Rds} \\ T_{Lin} - T_{Lds} \end{pmatrix}$$

Equation of motion of driving side $$\begin{pmatrix} \omega_{Sds} \\ \omega_{Dds} \end{pmatrix} = \frac{P_M}{G^2}\begin{pmatrix} 1 & 0 \\ 0 & \frac{1}{|Z|} \end{pmatrix}\begin{pmatrix} T_{Sin} - T_{Sds} \\ T_{Din} - T_{Dds} \end{pmatrix}$$

[D. Equation of Motions of Wheel and Axle (Sum/Difference Models)]

Likewise the derivation of the equation of motion of the driving side, the equations of motion of the left and right wheels 5 (load side) and the axles 4 may be formulated as follows.

[Math 13]

Equation of motion of left and right wheels 5 (load side)

$$\begin{pmatrix} \omega_{RL} \\ \omega_{LL} \end{pmatrix} = P_L \begin{pmatrix} T_{Rds} - T_{RL} \\ T_{Lds} - T_{LL} \end{pmatrix}$$

$$\begin{pmatrix} \frac{1}{2} & \frac{1}{2} \\ \frac{1}{2} & -\frac{1}{2} \end{pmatrix} \begin{pmatrix} \omega_{RL} \\ \omega_{LL} \end{pmatrix} = P_L \begin{pmatrix} \frac{1}{2} & \frac{1}{2} \\ \frac{1}{2} & -\frac{1}{2} \end{pmatrix} \begin{pmatrix} T_{Rds} - T_{RL} \\ T_{Lds} - T_{LL} \end{pmatrix}$$

$$\begin{pmatrix} \omega_{SL} \\ \omega_{DL} \end{pmatrix} = P_L \begin{pmatrix} T_{Sds} - T_{SL} \\ T_{Dds} - T_{DL} \end{pmatrix}$$

Equation of motion of axles 4

$$\begin{pmatrix} T_{Rds} \\ T_{Lds} \end{pmatrix} = P_{DS} \begin{pmatrix} \omega_{Rds} - \omega_{RL} \\ \omega_{Lds} - \omega_{LL} \end{pmatrix}$$

$$\begin{pmatrix} \frac{1}{2} & \frac{1}{2} \\ \frac{1}{2} & -\frac{1}{2} \end{pmatrix} \begin{pmatrix} T_{Rds} \\ T_{Lds} \end{pmatrix} = P_{DS} \begin{pmatrix} \frac{1}{2} & \frac{1}{2} \\ \frac{1}{2} & -\frac{1}{2} \end{pmatrix} \begin{pmatrix} \omega_{Rds} - \omega_{RL} \\ \omega_{Lds} - \omega_{LL} \end{pmatrix}$$

$$\begin{pmatrix} T_{Sds} \\ T_{Dds} \end{pmatrix} = P_{DS} \begin{pmatrix} \omega_{Sds} - \omega_{SL} \\ \omega_{Dds} - \omega_{DL} \end{pmatrix}$$

[4. Effects]

(1) The above design method prepares the sum model modeling motion states of the left driving system and the right driving system while the vehicle 1 is running straight, and the difference model modeling motion states of the left driving system and the right driving system while the vehicle 1 is cornering. In addition, the design method equivalent calculates the sum value corresponding to the sum of the left-axle I/O (input/output) including an input parameter or an output parameter of the left driving system and the right-axle I/O including an input parameter or an output parameter of the right driving system, and the equivalent difference value corresponding to a difference between the left-axle I/O and the right-axle I/O. Furthermore, the design method grasps the motion states of the left driving system and the right driving system while the vehicle 1 is running straight by applying the equivalent sum value to the sum model, and grasps the motion states of the left driving system and the right driving system while the vehicle 1 is cornering by applying the equivalent difference value to the difference model.

The above design device 20 includes the calculator 21 and the storing unit 22. The calculator 21 calculates the equivalent sum value corresponding to the sum of the left-axle I/O and the right-axle I/O and calculates the equivalent difference value corresponding to the difference between the left-axle I/O and the right-axle I/O. The storing unit 22 stores the sum model modeling motion states of the left driving system and the right driving system while the vehicle 1 is running straight and being applied with the equivalent sum value, and the difference model modeling motion states of the left driving system and the right driving system while the vehicle 1 is cornering and being applied with the equivalent difference value.

With the above configuration, a behavior of a driving system while the vehicle 1 is running straight can be precisely grasped by applying the equivalent sum value to the sum model, and also a behavior of the driving system while the vehicle 1 is cornering can be precisely grasped by applying an equivalent difference value to a difference model. In a driving system having a different characteristic between running straight and cornering of the vehicle 1, the state (behavior) of the driving system can be precisely grasped and control having preferable controllability (e.g., control accuracy and control response speed) can be designed with a simple configuration. In addition, by separating the sum model corresponding to the running-straight state and the difference model corresponding to the cornering state from each other and constructing the models independent from each other, frequency response-characteristics and other characteristics of the respective states can be clarified, and for example, the damping control and the slip control can be designed more simply.

(2) In the above embodiment, both the sum model and the difference model can be constructed to be two-inertia system models. This makes it possible to precisely grasp the motion states of the left and right driving systems while the vehicle 1 is running straight and while the vehicle 1 is cornering with a simple configuration. In addition, on a characteristic that is different between running straight and cornering, control considering the respective viscoelasticity can be carried out. Therefore, the controllability of vehicle 1 can be enhanced.

(3) As shown in FIG. 7A, the above sum model can be expressed by the two-inertia system including the driving-side inertia calculated based on inertia of the left motor 2L and the right motor 2R, the spring damper designed with the stiffness and viscosity, and the load-side inertia calculated based on the vehicle body weight of the vehicle 1. The input/output characteristic of this two-inertia system can be expressed by, for example, the transfer function shown in [Math 5]. As a result, the behavior of the driving system while the vehicle 1 is running straight can be precisely grasped, considering the viscoelasticity, so that the controllability of the vehicle 1 can be enhanced.

(4) As shown in FIG. 7B, the above difference model can be expressed by the two-inertia system including the driving-side inertia corresponding to the equivalent inertia calculated based on a torque difference amplification ratio of when a left-right difference is generated, the spring damper designed with the stiffness and viscosity, and the load-side inertia calculated based on the yaw inertia of the vehicle 1. The input/output characteristic of this two-inertia system can be expressed by, for example, the transfer function shown in [Math 8]. As a result, the behavior of the driving system while the vehicle 1 is cornering can be precisely grasped, considering the viscoelasticity, so that the controllability of the vehicle 1 can be enhanced.

[5. Miscellaneous]

The above embodiment is merely illustrative, and is not intended to exclude the use of various modifications and techniques not explicitly described in the present embodiment. Each configuration of the present embodiment can be variously modified and implemented without departing from the scope thereof. In addition, the configurations of the present embodiment can be selected and omitted as needed, or can be combined appropriately. For example, the above embodiment describes the 1 that mounts thereon the pair of motors 2 serving as driving sources, but the motors 2 may be alternatively replaced by an internal combustion engine. The specific type of the driving source is not limited.

The above embodiment illustrates the vehicle 1 that includes a vehicle driving device (DM-AYC device) including the pair of motors 2 and the power distributing mechanism 3. However, the concept of the sum model and the difference model can be applied to any vehicle exemplified by a vehicle without the power distributing mechanism 3 or an in-wheel motor vehicle. A vehicle provided with at least a left driving system including a left axle and a left wheel to which motion power from the left driving source is transmitted and a right driving system including a right axle and a right wheel to which motion power from the right driving source is transmitted can undergo the control the same as the above embodiment and can obtain the same actions and effects as those of the above embodiment.

APPENDIX

In relation to the above embodiment and the modifications, the following appendices will now be disclosed.

[Appendix 1]

A design device for output control of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel, the vehicle control device comprising:

a calculator that calculates an equivalent sum value corresponding to a sum of a left-axle input/output including an input parameter or an output parameter of the left driving system and a right-axle input/output including an input parameter or an output parameter of the right driving system, and an equivalent difference value corresponding to a difference between the left-axle input/output and the right-axle input/output; and a storing unit that stores a sum model modeling motion states of the left driving system, the right driving system, the left driving source, and the right driving source while the vehicle is running straight, and a difference model modeling motion states of the left driving system, the right driving system, the left driving source, and the right driving source while the vehicle is cornering, the equivalent sum value being applied to the sum model, the equivalent difference value being applied to the difference model.

[Appendix 2]

The design device according to Appendix 1, wherein the sum model and the difference model are both two-inertia system models.

[Appendix 3]

The design device according to Appendix 1 or 2, wherein the sum model includes a transfer function indicating an input/output characteristic of a two-inertia system including driving-side inertia calculated based on inertia of the left driving source and the right driving source, a spring damper designed with a stiffness and a viscosity, and load-side inertia calculated based on a vehicle body weight of the vehicle.

[Appendix 4]

The design device according to any one of Appendices 1-3, wherein the difference model includes a transfer function indicating an input/output characteristic of a two-inertia system including driving-side inertia corresponding to equivalent inertia calculated based on a torque difference amplification ratio of when a left-right difference is generated, a spring damper designed with a stiffness and a viscosity, and load-side inertia calculated based on yaw inertia of the vehicle.

INDUSTRIAL APPLICABILITY

The present embodiment is applicable to manufacturing industries of a design device and the vehicle control device and also applicable to manufacturing industries of a vehicle that is implemented with the control designed by the design device and a vehicle provided with the vehicle control device.

DESCRIPTION OF REFERENCE SIGN

1: Vehicle
2: Motor (Driving Source))
3: Power Distributing Mechanism
4: Axle
5: Left and Right Wheels
6: Inverter
7: Battery
10: Vehicle Control Device
14: Accelerator Position Sensor
15: Brake Sensor
16: Steering Angle Sensor
17: Resolver
18: Wheel Speed Sensor
20: Design Device
21: Calculator
22: Storing Unit
23: Controller

The invention claimed is:

1. A design method for output control of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel, the design method comprising:

preparing a sum model modeling motion states of the left driving system, the right driving system, the left driving source, and the right driving source while the vehicle is running straight, and a difference model modeling motion states of the left driving system, the right driving system, the left driving source, and the right driving source while the vehicle is cornering;

calculating an equivalent sum value corresponding to a sum of a left-axle input/output including an input parameter or an output parameter of the left driving system and a right-axle input/output including an input parameter or an output parameter of the right driving system, and an equivalent difference value corresponding to a difference between the left-axle input/output and the right-axle input/output;

grasping motion states of the left driving system and the right driving system while the vehicle is running straight by applying the equivalent sum value to the sum model; and grasping motion states of the left driving system and the right driving system while the vehicle is cornering by applying the equivalent difference value to the difference model.

2. The design method according to claim 1, wherein the sum model and the difference model are both two-inertia system models.

3. The design method according to claim 1, wherein the sum model includes a transfer function indicating an input/output characteristic of a two-inertia system including driving-side inertia calculated based on inertia of the left driving source and the right driving source, a spring damper designed with a stiffness and a viscosity, and load-side inertia calculated based on a vehicle body weight of the vehicle.

4. The design method according to claim 2, wherein
the sum model includes a transfer function indicating an input/output characteristic of a two-inertia system including driving-side inertia calculated based on inertia of the left driving source and the right driving source, a spring damper designed with a stiffness and a viscosity, and load-side inertia calculated based on a vehicle body weight of the vehicle.

5. The design method according to claim 1, wherein
the difference model includes a transfer function indicating an input/output characteristic of a two-inertia system including driving-side inertia corresponding to equivalent inertia calculated based on a torque difference amplification ratio of when a left-right difference is generated, a spring damper designed with a stiffness and a viscosity, and load-side inertia calculated based on yaw inertia of the vehicle.

6. The design method according to claim 2, wherein
the difference model includes a transfer function indicating an input/output characteristic of a two-inertia system including driving-side inertia corresponding to equivalent inertia calculated based on a torque difference amplification ratio of when a left-right difference is generated, a spring damper designed with a stiffness and a viscosity, and load-side inertia calculated based on yaw inertia of the vehicle.

7. The design method according to claim 3, wherein
the difference model includes a transfer function indicating an input/output characteristic of a two-inertia system including driving-side inertia corresponding to equivalent inertia calculated based on a torque difference amplification ratio of when a left-right difference is generated, a spring damper designed with a stiffness and a viscosity, and load-side inertia calculated based on yaw inertia of the vehicle.

8. The design method according to claim 4, wherein
the difference model includes a transfer function indicating an input/output characteristic of a two-inertia system including driving-side inertia corresponding to equivalent inertia calculated based on a torque difference amplification ratio of when a left-right difference is generated, a spring damper designed with a stiffness and a viscosity, and load-side inertia calculated based on yaw inertia of the vehicle.

9. A vehicle control device for output control of a left driving source and a right driving source in a vehicle provided with a left driving system including a left axle and a left wheel and a right driving system including a right axle and a right wheel, motion power from the left driving source being transmitted to the left axle and the left wheel, motion power from the right driving source being transmitted to the right axle and the right wheel, the vehicle control device comprising:
 a calculator that calculates an equivalent sum value corresponding to a sum of a left-axle input/output including an input parameter or an output parameter of the left driving system and a right-axle input/output including an input parameter or an output parameter of the right driving system, and an equivalent difference value corresponding to a difference between the left-axle input/output and the right-axle input/output; and
 a storing unit that stores a sum model modeling motion states of the left driving system, the right driving system, the left driving source, and the right driving source while the vehicle is running straight, and a difference model modeling motion states of the left driving system, the right driving system, the left driving source, and the right driving source while the vehicle is cornering, the equivalent sum value being applied to the sum model, the equivalent difference value being applied to the difference model.

10. The vehicle control device according to claim 9, further comprising:
 a controller that controls outputs of the left driving source and the right driving source, using a sum-model state quantity obtained by applying the equivalent sum value to the sum model and a difference-model state quantity obtained by applying the equivalent difference value to the difference model.

* * * * *